Feb. 7, 1928.
A. G. RONNING ET AL
1,658,354
EARTH WORKING ATTACHMENT FOR TRACTORS
Original Filed March 12, 1921  3 Sheets-Sheet 1
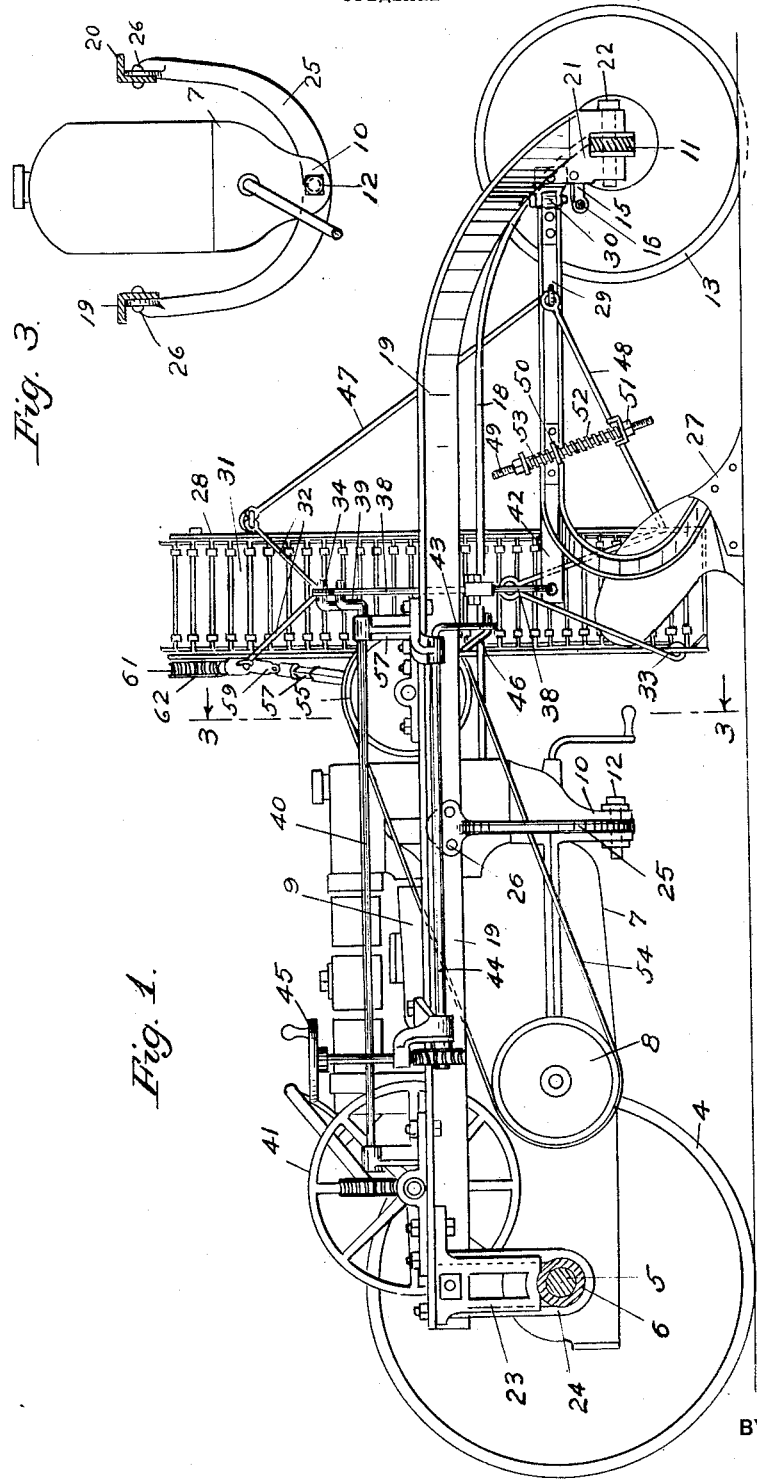
INVENTOR
ANDREAN G. RONNING
ADOLPH RONNING
BY
ATTORNEY

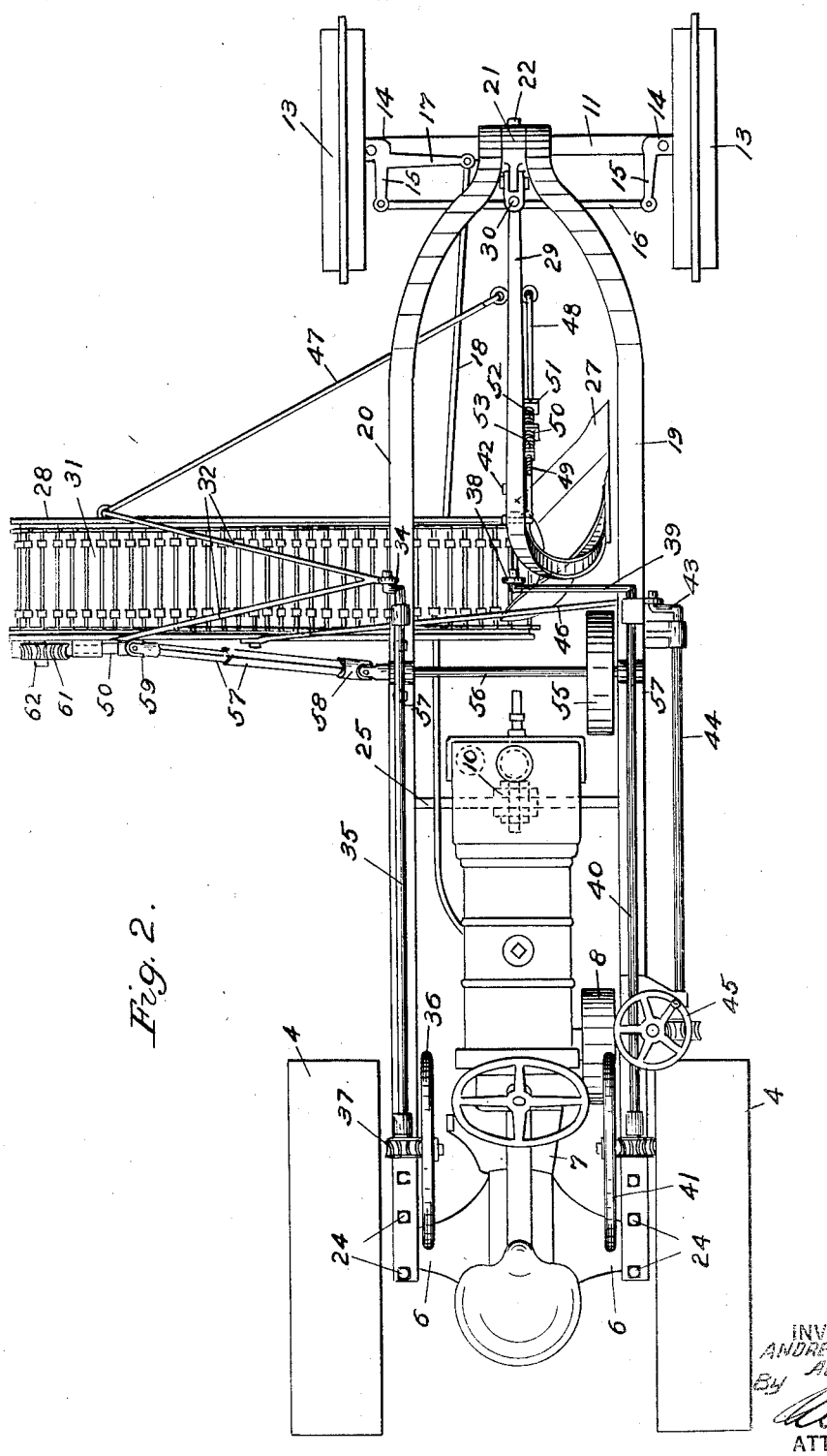

Feb. 7, 1928.
A. G. RONNING ET AL
1,658,354
EARTH WORKING ATTACHMENT FOR TRACTORS
Original Filed March 12, 1921    3 Sheets-Sheet 3
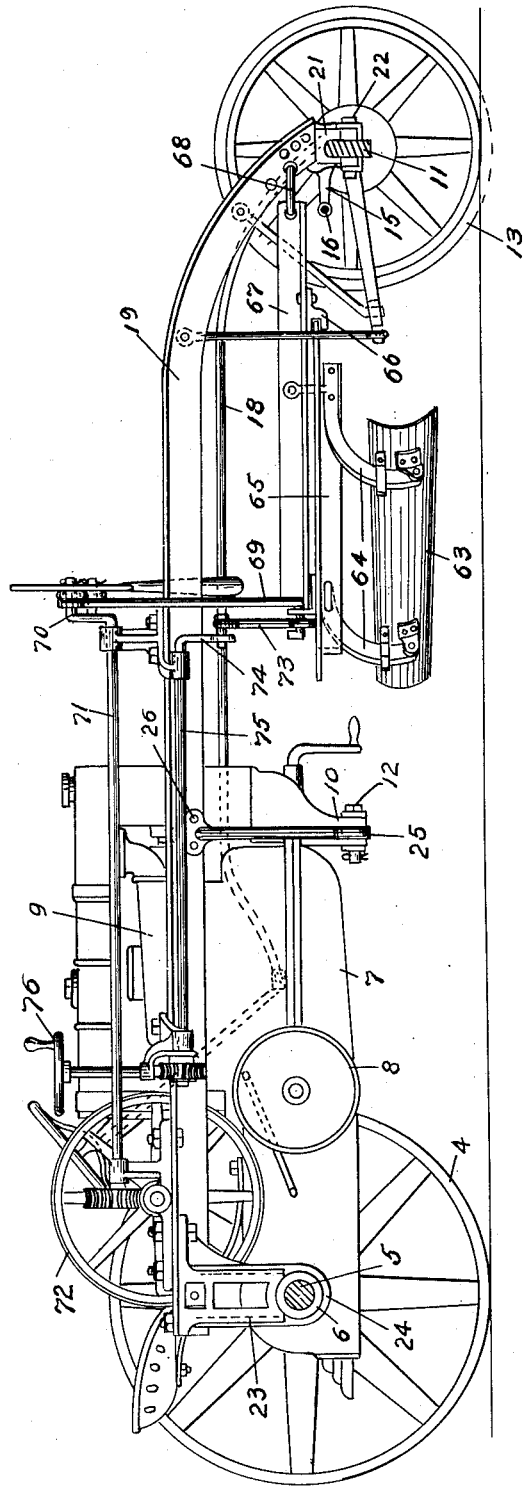
Fig. 4.
INVENTOR
ANDREAN G. RONNING
ADOLPH RONNING
BY
ATTORNEY Patented Feb. 7, 1928.

1,658,354

UNITED STATES PATENT OFFICE.

ANDREAN G. RONNING AND ADOLPH RONNING, OF MINNEAPOLIS, MINNESOTA, ASSIGNORS TO RONNING MACHINERY COMPANY, OF MINNEAPOLIS, MINNESOTA, A CORPORATION OF MINNESOTA.

EARTH-WORKING ATTACHMENT FOR TRACTORS.

Original application filed March 12, 1921, Serial No. 451,746. Divided and this application filed April 9, 1927. Serial No. 182,427.

This invention relates to earth working attachments for tractors and the primary object is to provide a combination tractor and implement in which both are supported by the same wheels, and are so associated that a single operator may regulate and have under complete control both the tractor and the implement or working unit. A further object is to provide means of a novel nature for easily and quickly converting an ordinary tractor into such a machine by removing the usual fore carriage or steering unit and substituting for it a wheeled frame, by which is carried the working implement. Further and more specific objects will be disclosed in the course of the following specification, reference being had to the accompanying drawings, in which:

Fig. 1 is a side elevation of our combination tractor implement, the near front and rear wheels being removed, the implement in this instance comprising a plow and transverse conveyor.

Fig. 2 is a plan view of the machine shown in Fig. 1.

Fig. 3 is a sectional detail elevation about as on the line 3—3 in Fig. 1.

Fig. 4 is a side elevation similar to Fig. 1, the implement in this case being a scraper blade.

This application is a division of our former application for patent for traction implement, the same having been filed in the United States Patent Office on March 12, 1921, under Serial No. 451,746.

The invention, two preferred forms of which are illustrated will now be described in detail, reference being had to the accompanying drawings in which like parts will be referred to by like characters.

The traction or power unit employed, in the present instance, in carrying out our invention, consists of a well known type of tractor in which the numeral 4 designates the rear traction wheels, 5 the rear axle, 6 the rear axle housing, 7 the cast frame work including the engine base, 8 the usual power pulley, and 9 the engine which drives the pulley, and also drives the rear traction wheels through any suitable transmission mechanism such as is customarily used in tractors of this type.

The front end of the frame 7 is provided with the usual depending forked coupling bracket 10, to which, in the normal tractor, the front axle 11 is adapted to be intermediately pivoted as by a pivot bolt 12. The numeral 13 designates the front steering wheels, journaled in the customary spindle arms 14, pivoted to the axle 11, and provided with arms 15 connected for parallel movement by the customary connecting rod 16. One of the spindles 14 has an arm 17, to which the steering gear connecting rod 18 is pivotally connected at its front end. The steering carriage or dirigible wheel construction shown may be a different unit from that used on the tractor, but, in the present instance we find it more economical and practical to use the same construction, merely shifting it to a forward position, in which event it is only necessary to substitute the long connecting rod 18 for the usually employed shorter rod (not shown), which connects the spindle arm 17 to the steering gear when the steering carriage is in its normal position on the tractor.

For converting the normal tractor into a tractor plow or other earth-working implement, such as above broadly indicated, we provide a substitute forecarriage or extension frame, which, as shown, is made up of laterally spaced parallel angle or push bars 19 and 20, the front ends of which converge and are rigidly secured to a forked coupling bracket or casting head 21, to which the axle 11 is now pivotally connected by a pin or pivot bolt 22. The customary radius rod for the front axle is not shown in Figs. 1 and 2, but may be shifted and secured in a forward position as indicated in Fig. 4.

The rear ends of the frame bars 19 and 20 are provided with depending brackets 23 that rest on the rear axle housings 6 and are rigidly clamped thereto by nut equipped U-bolts 24. To support the front end of the tractor, (from which the steering unit has been removed) from the frame 19—20, we provide a yoke 25, the ends of which are secured to the frame bars, as at 26, while the intermediate depending portion of the yoke is secured, as by the bolt 12, in the coupling bracket 10.

The transformed or converted tractor as above described is now adapted to carry and to operate various different kinds of earth working units, two of which are illustrated as being typical and sufficient for purpose of illustration. It is obvious that the frame could easily be employed to carry such implements as cultivators, and other earth working implements, or harvesters, containers, conveyors, and other devices and machines such as are commonly pushed or pulled by tractors. Where such devices are pushed or pulled, however, there are a number of objectionable features and elements which the present invention is designed to eliminate. Thus, as both the power unit or tractor and the working implement are both incorporated in one machine they can both be under the control of a single operator, and as the implement is in front of the tractor it can easily be watched and regulated by the tractor operator who is usually stationed in the rear. As the entire machine is supported by not more than four wheels it can be steered to either side, backed up and otherwise guided as a single unit, in a manner not possible where the implement is supported on separate wheels and either pushed or pulled by the tractor. It will also be noted that the weight of the supplemented frame and the working implement is added to the weight of the tractor in such a manner as to increase the traction of the wheels 4 on the ground, and, conversely, the weight of the tractor is added to the weight of the frame and implement so as to cause the latter to operate more steadily and effectively. This latter advantage is particularly noticeable where ground working implements such as plows and graders are employed, as such implements frequently have a distinct and often great side draft which tends to shift the machine transversely from its normal direction of travel. It will also be noted that as the implement is positioned approximately midway between the now widely separated front and rear wheels, the increased wheel base length will permit but only a slight vertical movement of the implement as the machine travels over rough or uneven surfaces, which is particularly advantageous in soil working machinery.

The working unit or implement shown in Figs. 1 and 2 includes a plow 27 and a conveyor, which is associated with the plow, and is driven by the engine of the tractor as the machine progresses over the road or field, so as to plow up dirt and deliver it to one side of the machine.

The plow 27 is carried upon the rear end of a plow beam 29, the front end of which is loosely pivoted or otherwise suitably connected to the casting 21, as at 30, with freedom for movement therefrom.

The numeral 28 indicates a transversely arranged inclined elevator frame, in which is mounted to run an endless elevator belt 31. The elevator frame is adjustably supported by upper and lower forked hanger rods 32 and 33, respectively. The hanger rod 32 is pivoted to a crank 34 of a rod 35 which is journaled in suitable bearings carried by the frame bar 20. This rod 35 is rotatably adjusted by a hand wheel 36, through a worm gear mechanism 37. The lower hanger 33 is pivoted to the lower end of a rod 38, which is hung from a crank 39 of a rod 40. The rod 40 is adjusted by a hand wheel 41 in the same manner as the rod 35 is adjusted by the hand wheel 36. The lower end of the rod 38 is also pivotally associated with an extension 42 of the plow beam 29 so that the plow may also be raised and lowered as desired.

A third crank 43, of a shaft 44, is adjustable by a hand wheel 45, and is connected to the elevator frame by a thrust link or rod 46, by means of which the elevator frame may be moved or held transversely of the machine.

To hold the elevator frame against forward and rearward swaying movements, upper and lower stay rods 47 and 48 connect it with the low beam 29. To yieldingly hold the plow properly away from the receiving end of the elevator a spring device is employed which consists of a nut equipped bolt 49 which passes through lugs 50 and 51 on the plow beam and stay rod 48, coil springs 52 and 53 are then employed, as shown, to yieldingly hold the bolt in its properly adjusted position with respect to the plow beam.

The elevator belt 31 is driven from the tractor by a belt 54 which passes over a pulley 55 and the usual power pulley 8 of the tractor. The pulley 55 is mounted on a shaft 56, journaled in bearings 57 on the frame 19—20, and the shaft 56 drives a telescoping shaft 57 through a universal joint 58. A second universal joint 59 operatively connects the shaft 57 with a worm shaft 60, which drives a worm gear 61 on the upper conveyor shaft 62. Thus the conveyor belt will always be operatively associated with and driven by the engine of the tractor regardless of the position to which the conveyor frame may be adjusted.

The tractor, the extended frame or substitute fore-carriage, and the adjusting mechanisms, illustrated in Fig. 4 are substantially identical with those illustrated in Figs. 1 and 2, and are also the same as those same elements as disclosed in our parent application, Ser. No. 451,746. The earth working unit in this instance, however, is a scraper or grader, and is also shown in said parent application.

The grader construction comprises a scraper blade 63, which is connected as by curved brackets or draw bars 64, to an adjusting circle or annular member 65. This circle 65 is preferably an annular angle bar, the flange of which works in keeper brackets 66 secured on the bottom of a triangular supplemental frame 67. This supplemental frame 67, at its front end, is coupled to the front end of the frame 19—20, by a link 68, and at its rear end, the frame 67 is supported for vertical adjustment by links 69 carried by cranks 70 of rock shafts 71, which are mounted and controlled by hand wheels 72 in much the same manner that the cranks 34 and 39 are controlled by the hand wheels 36 and 41 in Fig. 2, thus enabling the operator to adjust the elevation and working angle of the blade as he so desires.

In order to shift the grader blade and its frame 67 transversely of the tractor we provide a cross link 73 which connects the left side of the frame 67 with the crank 74 of a shaft 75 which is controlled by the hand wheel 76, on the right side of the machine. The parts 73, 74, 75 and 76, correspond respectively, to the parts 46, 43, 44, and 45, shown in Figs. 1 and 2.

The specific substitute front frame, organization and construction herein disclosed forms the subject matter of our co-pending divisional application Ser. No. 52,137, filed August 24th, 1925.

It is understood that various and suitable modifications may be made in the invention as herein disclosed, provided, however, that such modifications come within the spirit and scope of the appended claims.

Having now therefore fully shown and described our invention, what we claim to be new and desire to protect by Letters Patent is:

1. An attachment adapted to be applied to tractors, having rear drive wheels and a fore carriage without changing their construction, comprising a wheeled frame serving to act as a substitute for the fore-carriage of a tractor, means for steering the wheels, and an earth working device carried by the frame.

2. An attachment for tractors, having rear drive wheels and a fore carriage comprising a wheeled frame adapted to be attached to a tractor in place of the usual fore-carriage, means for steering the wheels, and an earth working device carried by the frame movable up and down, but normally held against lateral movement relative to the frame.

3. A tillage attachment for tractors adapted to be applied to tractors without changing their construction comprising a wheeled frame serving to act as a substitute for the fore-carriage of a tractor, means for steering the wheels of the frame, and a tillage mechanism connected to the frame so as to move with it as it is steered.

4. The combination with a normal tractor having its fore carriage removed, of an auxiliary frame extending forwardly from the tractor and supporting the front end thereof, steering wheels supporting the front end of the frame, and an earth working unit connected to the frame in advance of the tractor.

5. A machine of the character described consisting of a normal tractor having its forecarriage removed, a frame adapted to support the front end of the tractor and extending forwardly thereof, steering means supporting the front end of the frame, and a working unit carried by the machine.

6. A machine of the class described consisting in combination of a normal tractor having its steering carriage removed, a wheel supported frame secured to the tractor for supporting the part thereof normally supported by the said steering carriage, an earth working implement carried by the frame, and means for steering the machine.

7. The combination with that part of a normal tractor which constitutes the power unit thereof and comprises the motor and rear traction wheels and transmission, of a frame attached to said power unit and extended forwardly thereof, the steering wheel unit of said tractor being removed from its primary connection and applied at the front portion of said extended frame.

8. The combination with that part of a normal tractor which constitutes the power unit thereof and comprises the motor and rear traction wheels and transmission, of a frame attached to said power unit and extended forwardly thereof, the steering wheel unit of said tractor being removed from its primary connection and applied at the front portion of said extended frame, and steering connections for operating said front wheels to steer the machine from the rear thereof.

9. The combination with that part of a normal tractor which constitutes the power unit thereof, and comprises the motor and rear traction wheels and transmission, of a frame attached to said power unit and extended forwardly thereof, the steering wheel unit of said tractor being removed from its primary connection and applied at the front portion of said extended frame, and a yoke supported from the intermediate portion of said frame and connected to said power unit at the place from whence said steering wheel unit was removed.

10. In a tractor, the combination with a power unit including a motor and rear traction wheels and transmission mechanism, of a frame detachably connected to said power unit and extended in advance thereof, and a front steering wheel unit, the front portion of said power unit and the front portion of said frame having means whereby said steering wheel unit may be coupled to either thereof, at will.

11. In a tractor, the combination with a power unit including a motor and rear traction wheels and transmission mechanism, of a frame detachably connected to said power unit and extended in advance thereof, and a front steering wheel unit, the front portion of said power unit and the front portion of said frame having means whereby said steering wheel unit may be coupled to either thereof, at will, said frame having a transverse yoke attached to said power unit at the place from whence said steering wheel unit is removed.

12. In a tractor, the combination with a power unit including a motor and rear traction wheels and transmission mechanism, of a frame detachably connected to said power unit and extended in advance thereof, a front steering wheel unit, the front portion of said power unit and the front portion of said frame having means whereby said steering wheel unit may be coupled to either thereof, at will, and means for operating said steering wheel unit to steer the machine from the rear thereof.

13. In a tractor, the combination with a power unit including a motor and rear traction wheels and transmission mechanism, of a frame detachably connected to said power unit and extended in advance thereof, a steering wheel unit supporting the front end of the frame, a front portion of said power unit and the front portion of said frame having means whereby said steering wheel unit may be coupled to either thereof, at will, said frame having a transverse yoke attached to said power unit at the place from whence said steering wheel unit it removed, and means for operating said steering wheel unit to steer the machine from the rear thereof.

In testimony whereof we affix our signatures.

ANDREAN G. RONNING
ADOLPH RONNING